(12) United States Patent
Laubenstein (10) Patent No.: US 8,878,446 B2
(45) Date of Patent: Nov. 4, 2014

(54) LIGHT MODULE FOR A MOTOR VEHICLE HEADLAMP AND METHOD AND ELECTRICAL CIRCUIT FOR OPERATING SAME

(75) Inventor: Ruediger Laubenstein, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 13/879,567

(22) PCT Filed: Oct. 11, 2011

(86) PCT No.: PCT/EP2011/067694
§ 371 (c)(1),
(2), (4) Date: May 23, 2013

(87) PCT Pub. No.: WO2012/049152
PCT Pub. Date: Apr. 19, 2012

(65) Prior Publication Data
US 2014/0145639 A1    May 29, 2014

(30) Foreign Application Priority Data

Oct. 15, 2010   (DE) .................. 10 2010 048 604

(51) Int. Cl.
*H05B 37/02* (2006.01)
*H05B 41/282* (2006.01)
*H05B 41/392* (2006.01)
*H05B 41/288* (2006.01)
*B60Q 1/00* (2006.01)

(52) U.S. Cl.
CPC ........ *H05B 41/2828* (2013.01); *H05B 41/3928* (2013.01); *Y02B 20/202* (2013.01); *H05B 41/2887* (2013.01); *H05B 41/2883* (2013.01); *B60Q 1/0094* (2013.01)
USPC ......................... 315/209 R; 315/82; 315/307

(58) Field of Classification Search
CPC .. B60Q 1/0094; Y02B 20/202; H05B 41/282; H05B 41/2828; H05B 41/2883; H05B 41/2887; H05B 41/3928
USPC ........... 315/77–80, 82, 209 R, 210, 291, 307, 315/308
See application file for complete search history.

(56) References Cited

U.S. PATENT DOCUMENTS

| 7,884,555 B2 * | 2/2011 | Nukisato et al. ............. 315/223 |
| 2006/0051300 A1 | 3/2006 | Chaudry |
| 2006/0197470 A1 | 9/2006 | Ribarich et al. |
| 2008/0211425 A1 | 9/2008 | Wilhelm et al. |
| 2009/0009098 A1 | 1/2009 | Nukisato et al. |

FOREIGN PATENT DOCUMENTS

| DE | 112007000465 T5 | 12/2008 |
| JP | 2006261031 A | 9/2006 |
| WO | 2006096638 A2 | 9/2006 |

OTHER PUBLICATIONS

Examination Report DE 10 2010 048 604.3 dated Oct. 29, 2010.

* cited by examiner

*Primary Examiner* — Jimmy Vu
(74) *Attorney, Agent, or Firm* — Howard & Howard Attorneys PLLC (57) ABSTRACT

A method operates a light source of a motor-vehicle headlight with direct current. The light source is actually designed for operation with alternating current. The light source comprises an inductive load and is arranged between bridge sections of an electrical H-bridge circuit having four semiconductor switches. During "alternating current" operation, the light source is supplied with the alternating current via the H-bridge circuit. Two of the semiconductor switches are arranged at a top and actuated via a respective bootstrap circuit.

16 Claims, 4 Drawing Sheets

LIGHT MODULE FOR A MOTOR VEHICLE HEADLAMP AND METHOD AND ELECTRICAL CIRCUIT FOR OPERATING SAME

CROSS-REFERENCE TO RELATED APPLICATIONS

This is a "national stage" application of International Patent Application PCT/EP2011/067694 filed on Oct. 11, 2011, which, in turn, is based upon and claims priority to German Patent Application 10 2010 048 604.3 filed on Oct. 15, 2010.

BACKGROUND OF INVENTION

1. Field of Invention

The invention relates to a method for operating a light source of a motor-vehicle headlamp using direct current while the headlamp was intended to be operated with alternating current. At the same time, the light source has an inductive load. The light source is wired between branches of an H-bridge circuit with four semiconductor switches. When operating with alternating current, the light source is supplied with the alternating current via the H-bridge circuit. In the process, both of the high-side semiconductor switches of the H-bridge circuit are extensively controlled, respectively, by at least one bootstrap capacitor.

Also, the invention relates to an electric circuit for operating a light source of a motor-vehicle headlamp using direct current while the headlamp was intended to be operated with alternating current, wherein the light source has an inductive load. The circuit includes an electric H-bridge circuit with four semiconductor switches for supplying the light source in the "AC" operation with alternating current (wherein the light source is wired between branches of the H-bridge circuit) and bootstrap circuits each provided with a bootstrap capacitor (wherein each of the bootstrap circuits is controlling one of the two high-side semiconductor switches of the H-bridge circuit).

Furthermore, the invention relates to a light module of a motor-vehicle headlamp. The light module includes a light source with inductive load and a circuit for operating the light source.

Finally, the invention relates to a motor-vehicle headlamp that includes a housing having a light-emitting aperture that is closed with a transparent cover plate and at least one light module arranged in the housing.

2. Description of Related Art

For example, a gas-discharge lamp (GDL) is a light source with an inductive load. The inductive load results from the inductive properties of a high-voltage ignition transformer for igniting and operating the gas-discharge lamp. Gas-discharge lamps are used in light modules of motor-vehicle headlamps.

The light module with the gas-discharge lamp can be designed as a reflection module in which the light emitted from the gas-discharge lamp is reflected by a reflector to generate a desired light distribution on the road in front of the motor vehicle. To generate minor variations in light distribution, it is possible to provide in the optical path optically effective profiles (for example, in the form of cylindrical lenses or prisms). The optical profiles can be designed on a cover plate (diffusion disc) of the motor-vehicle headlamp through which the light reflected by the reflector passes when it is emitted from the motor-vehicle headlamp. If the generated light distribution should feature a dimmed-light distribution with a basically horizontal cut-off limit, the shape of the reflector can be selected such that the reflected light emitted by the headlamps already has the desired cut-off limit without requiring additional means for switching off portions of the reflected light beams. Reflectors designed in this way are also called "free-form reflectors."

Alternatively, the light module with the gas-discharge lamp can be designed also as a so-called "projection module" in which the light emitted by the gas-discharge lamp is first concentrated by a primary optical device (for example, a reflector) and then represented by a secondary optical device (for example, a projection lens) for generating a desired light distribution on the road in front of the motor vehicle. If the generated light distribution should feature a basically horizontal cut-off limit (for example, for generating a dimmed-light distribution, like low-beam light or fog light) and/or a vertical cut-off limit [for example, to realize partial high-beam light (other road users in front of the motor vehicle are specifically shielded from high-beam-light distribution) or a marker light (objects or persons in front of the motor vehicle are specifically illuminated)], at least a respective shutter arrangement can be arranged in the optical path between the primary and the secondary optical device, which shutter arrangement blocks a portion of the concentrated light beams. A basically horizontal upper edge (for generating the horizontal cut-off limit) and/or a basically vertical lateral edge (for generating the vertical cut-off limit) of the shutter arrangement is represented by the secondary optical device as "light/dark" transition on the road in front of the motor vehicle.

To vary the light distribution generated by the projection module, the shutter arrangement can be inserted to a greater or lesser extent in the optical path. In this way, the generated light distribution can be switched (for example, between low-beam light and high-beam light) or the position and/or extent of a blocked-off area (when using partial high-beam light) or an illuminated area (when using marker light) can be changed. Furthermore, to achieve a variation in light distribution, it is possible to vary the progression of the represented edges of the shutter arrangement. Moreover, it is possible to select further light distributions (for example, between low-beam light and high-beam light). The light distributions are defined by intermediate positions of the shutter arrangement between the position for low-beam light and the position for high-beam light and/or by varying the progression of the edge of the shutter arrangement represented by the secondary optical device. For example, such further light distributions involve city-light distribution, highway-light distribution, expressway-light distribution or rain, snow, or other bad-weather light distribution or the like.

Usually, gas-discharge lamps are operated with alternating current to avoid, among other things, overheating of the electrodes between which the electric arc is generated and to avoid associated consequences, including a failure of the gas-discharge lamp. Gas-discharge lamps can be dimmed only to a limited extent (i.e., operated with reduced current because with lower currents the electrodes cool off, which increases the "electron work" function, but reduces the light-emitting ability). The lower the current, the more re-ignition voltage has to be applied for the reversal in current direction when operating with alternating current. Low currents or outputs result in commutation problems that appear as light flickering or can result even in completely extinguishing the electric arc.

It is possible to design a control circuit for gas-discharge lamps such that the gas-discharge lamp can be dimmed when operated with alternating current. To prevent the electrodes from cooling off too much and avoid the associated commutation problems, the control circuit could just before switching increase the output by, for example, increasing the current from the usual value of, for example, 600 mA required for operation to, for example, approximately 1 A. This involves an output increase of approximately 50%. As a result, the electrodes could be heated prior to switching, reducing the work function and the voltage required for switching. However, this is associated with higher energy consumption and higher stress on the control circuit and the gas-discharge lamp and reduced service life because of the intermittent process of heating the electrodes.

Because of their special structure, gas-discharge lamps of more modern design provide the possibility starting at a specific non-critical electrode temperature to switch from "alternating current" operation to "direct current" operation without damaging the lamp. At the same time, the electrodes of the gas-discharge lamp are designed such that, during "direct current" operation, a thermal balance occurs on an electrode that, on the one hand, incorporates the temperature increase resulting from the electrons/ions arriving at the electrode and, on the other hand, a temperature reduction resulting from the heat dissipation taking place via the material of the electrode. "Direct current" operations allow for considerably lower outputs without causing the above-mentioned light flickering or even completely extinguishing the electric arc as a result of commutation problems.

To operate gas-discharge lamps with alternating current, usually a so-called "H-bridge circuit" is used. The Hl-bridge circuit includes four controllable semiconductor switching elements (in an embodiment, in the form of transistors) and converts DC-link direct voltage into square-wave alternating current by converting one branch of the H-bridge circuit in which one side of the load is arranged with a specific frequency between the positive-supply voltage and ground, on the one hand, and the other branch of the bridge in which the other side of the load is arranged between ground and the positive-supply voltage, on the other hand. In the process, the voltage over the load is represented as differential voltage of the branches of the bridge that switch back and forth between positive and negative DC-link voltage. In the circuits known from the prior art, depending on the design of the semiconductor circuit and its control electronics, a permanent "direct current" operation can be maintained only with more or less extensive effort.

When using N-channel MOSFETs or IGBTs as high-side switches in which the drain is connected with the positive DC-link voltage V+ (for example, V+=500V), the gate potential for control has to be higher than the source potential at least by the threshold voltage Uth (for example, Uth=2 to 4 V). In switched-on state (when the semiconductor switch is conductive), drain and source are almost on the same potential. Therefore, the gate has to be provided with a voltage that is at least by the threshold voltage higher than the DC-link voltage V+ (for example, Vg=510 V). In the prior art, this is usually realized with a so-called "bootstrap circuit." The bootstrap circuit includes a gate driver that is controlled via a level shifter and the supply voltage of which consists of a charged bootstrap capacitor having a base point at the source of the high-side switch (corresponding to the drain of the low-side switch and the output Uout of the H-bridge circuit), and an opposite pole is applied via a high-voltage bootstrap diode at a supply voltage Vs (for example, Vs=10 to 12 V). When controlling the low-side switch, the output Uout of the H-bridge circuit is applied to ground, and the bootstrap capacitor can be charged via the bootstrap diode approximately to supply voltage Vs. When the bridge circuit should be converted, the low-side switch is switched off (interrupted), and subsequently the high-side switch is controlled (conductive). As a result, the load from the bootstrap capacitor is switched via the gate driver between gate and source of the high-side switch, whereby the potential of the source (corresponding to the output voltage Uout of the H-bridge switch) to the DC-link voltage V+. As a result, the entire bootstrap circuit in the potential is shifted to the DC-link voltage V+, and the bootstrap diode is blocked, wherein the gate voltage of the high-side switch is higher than the DC-link voltage V+ (approximately 500 V) by the bootstrap voltage (approximately 10 to 12 V).

Through stray currents (supply of the gate driver plus reverse current of the bootstrap diode plus reverse current of the level shifter), the bootstrap capacitor is discharged, whereby the high-side switch involuntary and independently is switched off when it falls below the threshold voltage Uth. When operating the gas-discharge lamp with alternating current, this does not cause any problems. However, it considerably restricts the period of time in which the gas-discharge lamp can be operated in "DC" operation. The maximum time in which the high-side switch can continue to operate is defined by the capacity of the bootstrap capacitor, the stray currents, the supply voltage Vs, and the threshold voltage Uth of the semiconductor voltage. However, the maximum period of time is definitely restricted, which determines the minimum operating frequency of "AC" operation. Consequently, by the control circuit described above and known from the prior art, it is not possible to perform a longer or even unlimited "DC" operation of the gas-discharge lamp.

However, to make "DC" operation of a gas-discharge lamp possible, the load discharged from the bootstrap capacitor has to be tracked. According to the prior art, this is realized by using complex high-voltage pump circuits (level shifter with capacitive charge pumps or potential-free transformer coils with rectifier). For example, DE 11 2007 000 465 T2 discloses that it is necessary to use additional transformer coils of an already available low-voltage transformer, an additional high-voltage diode (designed for up to 600 V) with particularly small stray currents, and an additional Zener diode connected in parallel to the bootstrap capacitor to be able to track the load flowing from the bootstrap capacitor. By these additional circuit elements, the bootstrap capacitor can be charged with temporary current pulses during "DC" operation and, as a result, track the load flowing from the bootstrap capacitor. However, the proposed solution has the disadvantage that it results in considerably higher energy consumption and requires additional components. Therefore, in DE 11 2007 465 T2, the required additional components are provided only for a bootstrap circuit. This has the disadvantage that "DC" operation is possible only in one direction. Furthermore, the transformer coils are positioned on the potential of the DC-link voltage V+ (approximately 500 V) and has to be elaborately insulated toward the low voltage of the low-voltage transformer.

Based on the prior art described above, the invention has the objective of providing dimming or power control of gas-discharge lamps in "DC" operation despite using bootstrap-control without requiring additional measures or components.

SUMMARY OF INVENTION

Based on the above-mentioned method to solve this problem, it is proposed that, in "direct current" operation, periodically at least one of the closed semiconductor switches of the H-bridge circuit is temporarily disconnected and re-connected at the end of the recharging process, wherein the recharging process is concluded before the current flowing via the branch of the H-bridge circuit reaches a value of 0 amps.

The invention involves the important aspect of recharging the bootstrap capacitor of the bootstrap control through a pulsed, very short disconnection of the H-bridge circuit without the light source being turned off. Because of the inductive load of the light source, the current flowing via the branch of the H-bridge circuit is not changed abruptly when the Hi-bridge circuit is shortly disconnected, but changes relatively slowly (for example, according to an E-function). So-called "source-drain diodes" are connected in parallel to the semiconductor switches of the H-bridge circuit, which diodes operate as free-wheeling diodes when the semiconductor switch is disconnected, thus allowing a free-wheeling current to flow via the branch of the H-bridge circuit. As a result, the branch tips independently from the potential to the ground that, in turn, causes the bootstrap capacitor to be charged. The invention has the advantage that it makes it possible to dispense with additional components and their elaborate electric integration into the available control circuit as required, for example, by DE 11 2007 000 465 T2. Furthermore, the invention allows for "DC" operation in both directions without additional effort.

When operating gas-discharge lamps with alternating current, with each short-term switching operation (commutation operation) of the H-bridge circuit, the output voltage Uout of the Hi-bridge circuit is reversed to the same magnitude (DC-link voltage V+), but with opposite signs, by switching, respectively, the left and the right side of the bridge from ground to the positive DC-link voltage (+V+) or from the positive DC-link voltage (V+) to ground. Because of the inductive load, the lamp current flowing via the branch of the bridge drops in the form of an E-function with a fixed time constant, reaches after a specific period of time the current's passage through zero, changes direction, and increases according to amount in the opposite direction.

At the moment at which the connected (conductive) semiconductor switches of the H-bridge circuit are disconnected (interrupted or at high impedance), the inductivity of the inductive load of the light source carries the lamp current in the same direction, whereby the output potentials of the sides of the bridge tip independently in that the output capacities are charged or discharged until the free-wheeling diodes connected in parallel to the semiconductor switches assume electricity.

The side of the bridge that previously was connected to the DC-link voltage V+ and the bootstrap capacitor of which lost load through stray currents during this phase is going to tip to ground because of the disconnection of the high-side switch. As a result, the bootstrap capacitor is recharged via the bootstrap diode.

In the invention, this effect is used to allow the bootstrap capacitor to be charged in "DC" operation during a relatively short period of time before the lamp current has reached the current's passage through zero (i.e., without changing to "alternating current" operation). As a result, it is possible to reconnect in the original direction and have the current increase in the original direction before reaching the current's passage through zero and not, as customary, reconnect in "alternating current" operation in reverse direction and completely convert the current. This results in "direct current" operation of the light source, wherein the bootstrap capacitor of the bootstrap circuit is recharged periodically to track the discharged load.

The invention makes it possible to operate light sources with inductive load, especially gas-discharge lamps, using an Hi-bridge circuit with bootstrap gate control of the high-side switch of the H-bridge with extremely low power or relatively strong dimming. At the same time, it is possible to avoid providing expensive additional pump circuits. The invention also does not require an additional transfer with high-voltage transformer coils and/or high-voltage diodes or high-voltage transistors. Rather, to implement the invention, it is merely required to use components that are already available in the control circuit. Finally, the invention provides the possibility of reducing the capacity of the bootstrap capacitor, downsizing it in comparison with previous capacitors because it is periodically recharged during the "DC" operation. On the one hand, the smaller design of the bootstrap capacitor with lower capacity saves room on the circuit board and, on the other hand, results in cost-saving.

The process of recharging the bootstrap capacitor can be performed on a regular basis at specific intervals. However, the recharging process can also be performed at any time when the voltage of the bootstrap capacitor has reached or exceeded a predetermined threshold value. In an embodiment, the threshold value is defined such that, for a predetermined period of time, the voltage still available in the capacitor is definitely sufficient for safely and reliably controlling or keeping open the semiconductor switch(es) of the H-bridge. In this way, it can be ensured that the voltage of the bootstrap capacitor is never reduced to the extent that the semiconductor switch of the H-bridge can no longer be safely and reliably controlled or kept open. Rather, until the process of recharging is successfully concluded, the voltage of the bootstrap capacitor is definitely at a sufficiently high level.

Other objects, features, and advantages of the invention are readily appreciated as they become more understood while the subsequent detailed description of at least one embodiment of the invention is read taken in conjunction with the accompanying drawing thereof.

BRIEF DESCRIPTION OF EACH FIGURE OF DRAWING OF INVENTION

DETAILED DESCRIPTION OF EMBODIMENTS OF INVENTION

Figure 1:
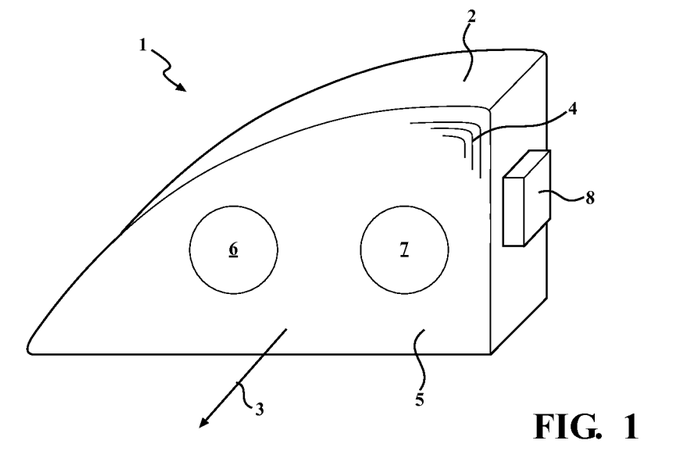
FIG. 1 shows a motor-vehicle headlamp according to an embodiment of the invention.

In FIG. 1, a headlamp according to the invention is shown in its entirety and generally indicated at 1. The headlamp 1 includes a housing 2 that, in an embodiment, is produced from plastic material. The headlamp 1 is built into and attached in an appropriate installation opening at the front of a motor-vehicle body. The headlamp housing 2 includes in a light-exit direction 3 a light-emitting aperture 5 that is closed by a cover plate 4. The cover plate 4 can be designed as a so-called "diffusion disc" with optically effective profiles (for example, cylinder lenses or prisms) or as a so-called "clear disc" without optically effective profiles. In the embodiment shown, two light modules 6, 7 are arranged in the interior of the housing 2. Of course, it is also possible to arrange in the housing 2 more or fewer of the two light modules 6, 7 shown. The light modules 6, 7 are used for implementing a front lighting or lamp function. The light modules 6, 7 can be designed in the headlamp housing 2 as a reflection module or projection module. In addition to the light modules 6, 7, further modules can be provided to perform specific lamp functions (for example, indicator lights, daytime-running lights, bending lights, etc.) (not shown in FIG. 1). In the embodiment shown, a control unit 8 for controlling the headlamp 1, individual light modules 6, 7, and/or individual components of the light module 6, 7 are arranged at the outside of the headlamp housing 2. For example, the control unit 8 can include a control circuit for a gas-discharge lamp of one of the light modules 6, 7. It is also possible to arrange the control unit 8 at any other place outside or inside of the housing 2 of the illuminating device 1. In particular, it is possible to design the control unit 8 or its functionality such that it is an integral component of an ignition unit arranged at the rear side of a gas-discharge lamp (for example, a lamp of the type "D5S").

Figure 2:
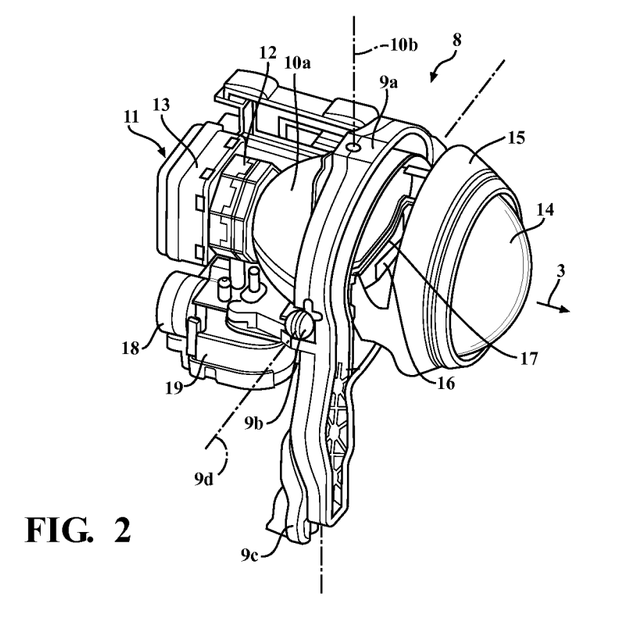
FIG. 2 shows a light module according to an embodiment of the invention.

In FIG. 2, one of the light modules 6, 7 is subsequently described in an exemplary manner. FIG. 2 shows a light module 6 designed as a projection module 6. The other light module 7 can be designed in the same or a different manner (for example, as a reflection module). The light module 6 includes an outer supporting frame 9a that is arranged on two bearings 9b defining a horizontal hinge on opposite sides of the supporting frame 9a and that can be swiveled about a horizontal axis 9d in the headlamp housing 2. By swiveling the light module 6 about the horizontal axis 9d, it is possible to vary a luminous range (so-called "headlamp-range-adjustment LWR"). To adjust the supporting frame 9a in relation to the housing 2, an actuating element is hinged at one place 9c of the supporting frame 9a (for example, in the form of an electromagnet or electric motor). The actuating element for the luminous-range adjustment is attached to the headlamp housing 2 (not shown in FIG. 2).

A reflector 10 has been arranged in the interior of the supporting frame 9a. In an embodiment, the reflector 10a is mounted in the supporting frame 9a and can be swiveled about a vertical rotation axis 10b in a horizontal direction. By swiveling the reflector 10a about the vertical axis 10b, it is possible to vary in the horizontal direction the direction of the emitted light beam and, in particular, to realize a dynamic "bending light" function. On the rear side of the reflector 10a, a light source 11 is arranged and attached at the reflector 19a by a reflector neck 12. The light source 11 is designed as a gas-discharge lamp, especially a gas-discharge lamp of the type "D5S" with integrated ignition unit and integrated control unit. In an embodiment, the ignition unit and the control unit are contained in a metal housing 13 at the rear side of the light source 11. A bulb (not shown) of the light source 11 protrudes through an opening in the apex of the reflector into the interior of the reflector 10a. In the bulb, an electric arc is ignited between two electrodes and maintained during the operation of the gas-discharge lamp 11. By the reflecting surface, the light emitted through the electric arc is concentrated in the interior of the reflector 10a and basically reflected in the light-exit direction 3. The light reflected by the reflector 10a is projected through a projection lens 14 arranged in the optical path for generating a specific light distribution on the road in front of the motor vehicle. By a lens holder 15 attached at the front edge of the reflector 10a, the lens 14 is held in the optical path.

Between the reflector 10a and the projection lens 14, a shutter arrangement 16 is arranged that blocks off a portion of the light reflected by the reflector 10a. An upper edge 17 of the shutter arrangement 16 is displayed on the road to generate a basically horizontal cut-off limit of the light distribution through the projection lens 14. In an embodiment, the position of the upper edge 17 of the shutter arrangement 16 and its progression can vary. By raising or lowering the upper edge 17, the cut-off limit of the resulting light distribution can be raised or lowered. By varying the progression of the upper edge 17, it is possible to vary the progression of the cut-off limit of the light distribution. In this way, the light module 6 can be switched, for example, between low-beam light and high-beam light. Furthermore, it is also possible to implement additional light distributions positioned between low-beam-light distribution and high-beam-light distribution (for example, city-light distribution, highway-light distribution, or expressway-light distribution). Furthermore, by varying the progression of the effective upper edge 17 of the shutter arrangement 16, it is possible, for example, to implement the function of partial high-beam light (oncoming-traffic other-road users in front of the motor vehicle are specifically shielded from high-beam-light distribution) or a marker light (persons or objects in front of the motor vehicle are specifically illuminated with a light beam arranged above the cut-off limit).

To implement the swiveling movement of the reflector 10a about the vertical rotation axis and to vary the position and progression of the upper edge 17, the shutter arrangement 16 and two separate actuating elements are arranged at the lower side of the light module 6. In FIG. 2, only one of the actuating elements (actuating element 18) is visible. The actuating elements 18 are flange-mounted to an outside gearbox 19 containing angle-gear. In an embodiment, the actuating elements 18 are designed as electric motors (in an embodiment, stepper motors). The angle-gear in the gearbox 19 sets a rotary motion of the motors 18 about a basically linear actuation movement for the swiveling movement of the reflector 10a about the axis 10b as well as for varying the position and/or the progression of the upper edge 17 of the shutter arrangement 16.

The light module 6 with the gas-discharge lamp 11 is basically designed to be operated with alternating current. During normal operation, the light module 6 is, therefore, operated with alternating current. However, during operation, the gas-discharge lamp 11 emits a lot of heat. Therefore, especially with relatively high outside temperatures and lack of cooling (for example, when a motor vehicle after a long continuous journey comes to an abrupt stop and has accumulated intense heat in the motor and entire engine compartment), it can occur that the temperature surrounding the light module 6 of the illuminating device 1 and/or the control unit 8 increases beyond a permissible measure so that a safe and reliable operation of the gas-discharge lamp 11 can no longer be guaranteed. In such a case, the emitted heat has to be reduced by decreasing the power losses. This is achieved by operating the gas-discharge lamp 11 with less power, especially with low current. Therefore, modern gas-discharge lamps 11 should be designed or controlled such that they can be operated for long periods of time in a dimmed condition (i.e., with reduced power).

Among other things, by operating gas-discharge lamps 11 with alternating current, it is possible to avoid overheating of the electrodes between which the electric arc is ignited and maintained during the period of operating the lamp 11. However, when the alternating current is reduced, the electrodes would cool off, which would increase the "electron work" function or reduce the light-emitting ability. Therefore, gas-discharge lamps 11 operated with alternating current can be dimmed only to a limited extent. In principle, the rule applies that the smaller the current, the more re-ignition voltage has to be applied for reversing the direction of the current. Consequently, low currents or outputs of the gas-discharge lamp result in commutation problems that appear as light flickering or can result even in completely extinguishing the electric arc. With power control, some gas-discharge lamps of more modern design provide the possibility of, starting at a specific non-critical electrode temperature, switching from "alternating current" operation to "direct current" operation without damaging the lamp 11. When operating lamps with direct current, considerably lower outputs can be used. However, the possibility of longer "direct current" operation has to be purchased with additional amount of time and money.

Figure 3:
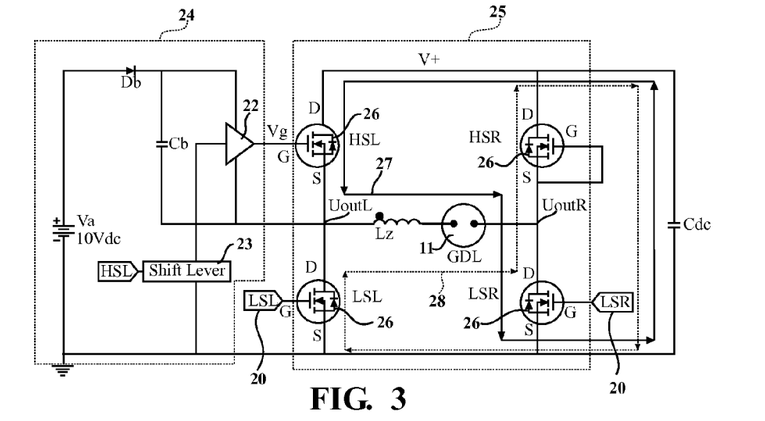
FIG. 3 shows a circuit for implementing a method according to an embodiment of the invention.

For "alternating current" operation, usually H-bridge circuits 25 (FIG. 3) are used, which include four controllable semiconductor switches (for example, in the form of transistors that are denoted in FIG. 3 with HSL, HSR, LSL, LSR). The gas-discharge lamp 11 (GDL) is connected between branches (between UoutL and UoutR) of the H-bridge circuit 25. Their inductive load resulting from the igniter is denoted with Lz. The Hi-bridge circuit 25 converts DC-link direct voltage V+ into square-wave alternating current applied to the branch of the bridge. Depending on the design of the semiconductor switches HSL, HSR, LSL, LSR and their control electronics, it is possible with more or less extensive effort to maintain a permanent "direct current" operation.

When using N-channel MOSFETs or IGBTs as high-side switches (HSL or HSR), in which the drain is connected with the positive DC-link voltage V+, the gate potential for control has to be higher than the source potential at least by the threshold voltage Uth. For example, the DC-link voltage V+ amounts to 500 V. Since, in a connected (conductive) condition, drain D and source S are almost on the same potential, the gate G has to be provided with a voltage Vg that is at least by the threshold voltage Uth higher than the DC-link voltage V+. For example, the gate is provided with a voltage Vg=510 V.

The control of the low-side switch (LSL or LSR) of the Hl-bridge circuit 25 can be performed directly via the indicated control 20. In the example shown in FIG. 3, the control of the high-side switch (HSL or HSR) of the H-bridge circuit 25 is performed via a so-called "bootstrap circuit" 24. The circuit 24 includes a gate driver 22 that is controlled by a level shifter 23. A power supply of the gate driver 22 consists of a charged bootstrap capacitor Cb the base point of which is applied at the source S of the high-side switch HSL (this corresponds to the drain D of the low-side switch LSL and the output UoutL of the H-bridge circuit 25) and the opposite pole of which is applied via a high-voltage bootstrap diode Db at a supply voltage Vs. For example, the supply voltage Vs amounts to 10 V. FIG. 3 merely shows a bootstrap circuit 24 for the left high-side switch HSL. Alternatively or additionally, it is also possible to provide a corresponding bootstrap circuit for the other high-side switch HSR. The preceding and following explanations of the description for controlling the gate G of the high-side switch HSL via the bootstrap circuit 24 apply in like manner also to controlling the gate G of the other high-side switch HSR via a corresponding bootstrap circuit.

When, during "alternating current" operation, the low-side switch LSL or LSR is controlled (closed or conductive), the output UoutL or UoutR of the H-bridge circuit 25 is applied to ground, and the bootstrap capacitor Cb of the bootstrap circuit 24 provided for the respective high-side switch HSL or HSR can be charged via the bootstrap diode Db of the circuit 24 to approximately the value of the supply voltage Vs. When the H-bridge circuit 25 is being switched, the low-side switch LSL or LSR is disconnected (opened or interrupted), and subsequently the high-side switch HSL or HSR is controlled (conductive or closed). As a result, the load of the bootstrap capacitor Cb is connected via the gate driver 22 between gate G and source S of the high-side switch HSL or HSR, whereby the potential of the source S (corresponding to the output YoutL or UoutR of the H-bridge circuit 25) jumps to the DC-link voltage V+. Consequently, the entire bootstrap circuit 24 in the potential is shifted to the DC-link voltage V+ (for example, 500 V), and the bootstrap diode Db is blocked, wherein the gate voltage Vg of the high-side switch HSL or HSR is higher than the DC-link voltage V+ by the bootstrap voltage (potential of the bootstrap capacitor Cb).

Through stray currents (supply of the gate driver 22 plus reverse current of the diode Db plus reverse current of the level shifter 23), the bootstrap capacitor Cb is discharged, switch HSL or HSR can remain connected is defined by the capacity of the bootstrap capacitor Cb, the stray currents, the supply voltage Vs and the threshold voltage Uth of the semiconductor switches HSL, HSR. However, it is definitely time restricted, whereby the minimal operating frequency of the "alternating current" operation is determined. To allow for a longer, unrestricted "direct current" operation of the gas-discharge lamp 11, the load flowing from the bootstrap capacitor Cb has to be tracked, which can be performed in an easy and quick manner by the circuit shown in FIG. 3.

When operation with alternating current, with each commutation operation (switching of the H-bridge circuit) the output voltage Uout of the H-bridge circuit 25 is reversed to the same magnitude (DC-link voltage V+), but with opposite signs, by switching, respectively, the left and the right side of the bridge from ground to the positive DC-link voltage (+V+), or from the positive DC-link voltage (+V+) to ground. Because of the igniter inductivity Lz in the form of an E-function, the lamp current I (Lz) drops with a fixed time constant, reaches the current's passage through zero, changes direction and increases again.

At the moment at which the semiconductor switches HSL, USR, LSL, LSR are disconnected (interrupted or at high impedance), the igniter inductivity Lz carries the lamp current in the same direction, whereby the output potentials of the sides of the bridge tip independently in that the output capacities are charged or discharged until the free-wheeling diodes 26 connected in parallel to the semiconductor switches HSL, HSR, LSL, LSR assume electricity. The side of the bridge that initially was connected to the positive DC-link voltage V+ and the bootstrap capacitor Cb of which lost load through stray currents during this phase tips to ground when the high-side switch HSL is disconnected. As a result, the bootstrap capacitor Cb can be recharged via the bootstrap diode Db.

The invention uses the effect that the capacitor Cb can be recharged before the lamp current I (Lz) has reached the current's passage through zero, which can take place already after only a few microseconds. This effect allows the capacitor Cb of the bootstrap circuit 24 to be recharged in "direct current" operation. In the process, the lamp current I (Lz) is reconnected in the original direction and increased before reaching the current's passage through zero and not, as customary in "alternating current" operation, reconnected in reverse direction and completely converted.

According to the invention, when operating a circuit with direct current, periodically at least one of the closed semiconductor switches HSL, LSR or HSR, LSL of the H-bridge circuit 25 is temporarily disconnected (interrupted or opened) during the recharging process, wherein the recharging process of the at least one semiconductor switch HSL, LSR or HSR, LSL of the Hi-bridge circuit 25 is concluded even before the current flowing via the branch of the H-bridge circuit 25 reaches a value of 0 amp. Advantageously, the recharging process lasts less than 5 µs, especially 2 µs (and especially, in an embodiment, 1 µs). The distance between two successive recharging processes (i.e., the frequency of the recharging process) is selected such that prior to the subsequent recharging process the load of the bootstrap capacitor Cb of the bootstrap circuit 24 is still big enough to safely control the at least one closed high-side switch HSL or HSR of the fl-bridge circuit 25 and maintain the closed condition. Advantageously, the distance between two successive recharging processes is selected in the "millisecond" range and amounts, in particular, to 2.5 ms (recharging frequency approximately 400 Hz).

FIG. 3 shows an invention-based circuit according to a first embodiment. Signal paths for the circuit are outlined in FIG. 4 and magnified in FIG. 5. According to the first embodiment shown in FIGS. 3 to 5, in "direct current" operation periodically a closed semiconductor switch HSL or HSR of the H-bridge circuit 25 operating as a high-side switch and a closed semiconductor switch LSR or LSL of the H-bridge circuit 25 operating as a low-side switch are temporarily disconnected. This means that both semiconductor switches HSL, LSR or HSR, LSL carrying load current 27 are disconnected. As a result, the H-bridge circuit 25 is completely disconnected. As required by the invention, this function can be quickly implemented in most customary drivers 22. Consequently, this embodiment can be implemented with customary control circuits for gas-discharge lamps 11, especially with customary bootstrap circuits 24.

When disconnecting the semiconductor switches HSL, LSR, the side of the bridge on which the previously actuated high-side switch is arranged tips independently to ground. In the example shown in FIG. 3, this involves the left side of the bridge. However, the other side of the bridge also tips independently to the DC-link voltage V+. In the process, the output voltage Uout of the I-bridge circuit 25 is reversed. Therefore, the current flows in free-wheeling mode 28 through the two blocked, previously current free semiconductor switches HSR, LSL to the output capacitor Cdc of the positive DC-link voltage V+ and increases it. In FIG. 3 the load current circuit is demonstrated through arrows at 27, and the free-wheeling electric circuit is also demonstrated through arrows at 28.

When operating the gas-discharge lamp with direct current, the free-wheeling current 28 is decelerated through the igniter inductivity Lz via the lamp current and in addition via the DC-link voltage V+ that initially have the same magnitude. However, the during the phase the voltage V+ increases even more because the output capacitor Cdc is being charged. In this type of circuit, the lamp current I (Lz) would approximate the negative initial value and after a certain period of time cross the current's passage through zero. This would correspond to a normal commutation in "alternating current" operation. During the period between the start of the recharging process and prior to reaching the current's passage through zero, the bootstrap capacitor Cb is being recharged. This embodiment is of special advantage when quick bootstrap diodes Db (because of the relatively short pulse) are available or a larger igniter inductivity Lz. This model can be implemented with any fast-working conventional control circuit.

Figure 4A:
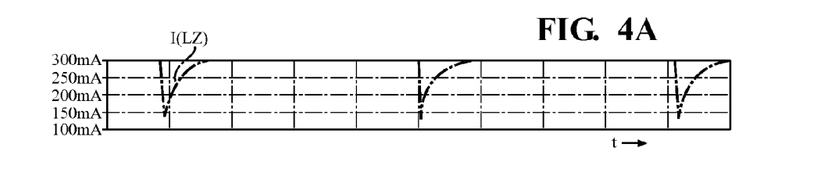
FIG. 4 shows different signal paths that occur during the operation of the circuit shown in FIG. 3.
Figure 5A:
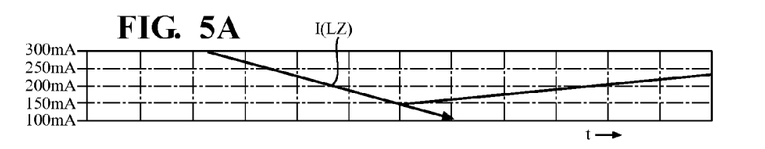
FIG. 5 shows the signal paths shown in FIG. 4 in a time domain between 0 and 6 μs.

FIGS. 4a and 5a show the progression of the lamp current during invention-based "direct current" operation. It is demonstrated that during the period of the recharging process the lamp current I (Lz) is reduced from the original value of, for example, 300 mA at the start of the recharging process (for example, at 1.0 µs) to a value of a little less than 150 mA at the end of the recharging process (for example, at 3.0 µs). When the recharging process is concluded, the lamp current I (Lz) is increased again to the original value of 300 mA. In FIG. 5a, the recharging process is concluded well before reaching the current's passage through zero I (Lz). When the recharging process is not concluded in time (i.e., when the semiconductor switches HSL, LSR are not reconnected in time), the current would (as customary in "alternating current" operation) reach zero point and when connecting the other bridge direction HSR, LSL it would be reversed and run in the direction −300 mA. This is represented in FIG. 5a by the dotted arrow.

Figure 4B:
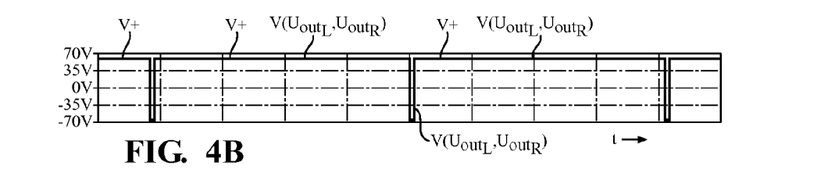
Figure 4C:
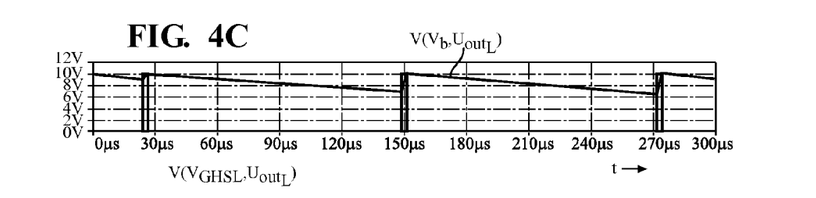
Figure 5B:
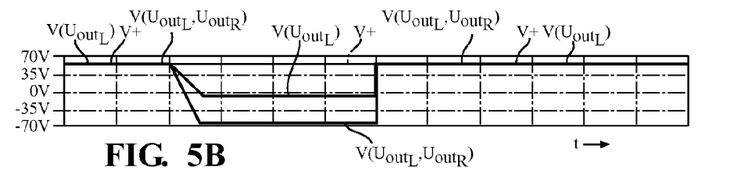

FIGS. 4b and 5b show the progression of the DC-link voltage V+, the output voltage UoutL of the left side of the bridge circuit 25 and the difference-bridge-output-voltage Uout=UoutL−UoutR of the left and right side of the bridge (i.e., the voltage dropping between the branches of the bridge circuit 25). The progression of the potential UoutL of the left side of the bridge is represented by a dotted line, whereas in FIG. 5a the progression of the potential of the bridge output Uout is represented by a continuous line. It is obvious that the left side of the H-bridge circuit 25 tips (dotted line) independently to ground (0 V) and that the output voltage of the Hi-bridge circuit 25 tips to the value of the negative DC-link voltage V+ (in this example to 60 V). FIG. 5b clearly shows the different progressions of the potentials at the left side or at the output of the H-bridge circuit 25 during the recharging process. During "direct current" operation (i.e., outside of the recharging process), the potential progressions are largely congruent. FIG. 4b shows a slight increase of the DC-link voltage V+ (dash-and-dot line) during the recharging process. This can be attributed to the return feed of the output capacitor Cdc. In the example shown, the output Uout of the H-bridge circuit 25 during the recharging process is applied to the negative value of the DC-link voltage V+, here to −60 V. The progression of the DC-link voltage V+ is shown in FIGS. 4b and 5b by a dash-and-dot line. In the diagrams of FIGS. 4 and 5, the voltage information V(Ux, Uy) represents the differential voltage Ux−Uy of the nodes x and y, the voltage information V(UoutL, UoutR) represents the differential voltage UoutL−UoutR (i.e., Uout). The voltage information V(UgHSL, UoutL) represents the differential voltage UgHSL−UoutL=Ugate−Usource=Ugs(HSL).

Figure 5C:
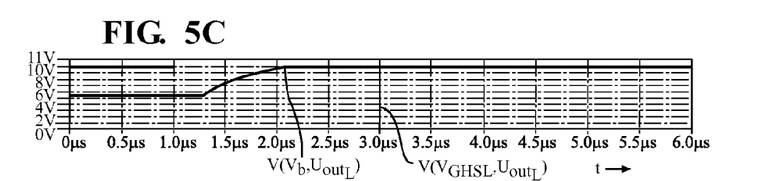

FIGS. 4c and 5c show the progression of the control signal for the gate-source-voltage UgHSL−UoutL of the high-side switch HSL and thus the start and end of the shutdown. At t=1.0 µs, the gate-control signal has a falling edge and at t=3.0 µs a rising edge. FIGS. 4c and 5c also show the progression of the voltage Vb−UoutL applied to the bootstrap capacitor Cb and thus the charge status of the capacitor Cb. The control signal V(VGHSL−UoutL) for the gate G of the this side switch HSL is represented by a continuous line, while the progression of the voltage V(Vb−UoutL) applied to capacitor Cb is represented by a dotted line. FIG. 4c clearly shows that during customary "direct current" operation (i.e., outside of the recharging process), the load of the bootstrap capacitor Cb is continuously reduced because of the stray currents. Furthermore, it is shown that in a short period of time during the recharging process the load is increased again to its original value.

Figure 6:
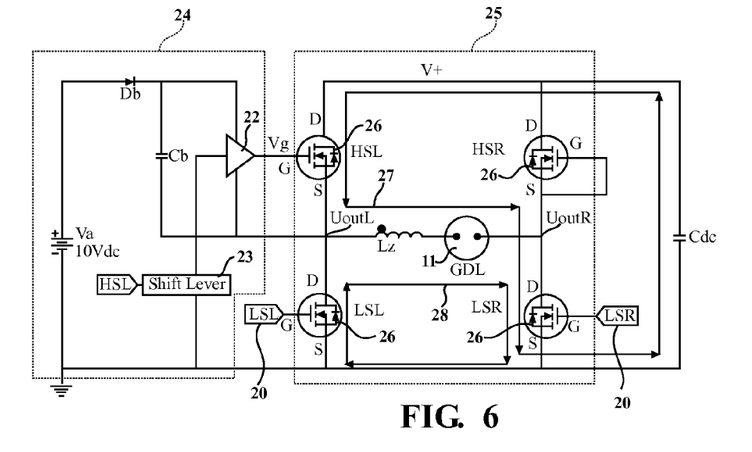
FIG. 6 shows a circuit for implementing a method according to another embodiment of the invention.
Figure 7A:
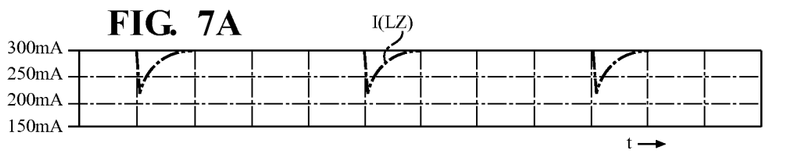
FIG. 7 shows different signal paths that occur during the operation of the circuit shown in FIG. 6 over a time domain between 0 and 300 μs.

FIG. 6 shows a further control circuit for implementing the invention according to an embodiment. The corresponding signal paths are outlined in FIG. 7 and magnified in FIG. 8. According to this embodiment, in "direct current" operation, periodically only the originally closed semiconductor switch HSL of the H-bridge circuit 25 operating as high-side switch is temporarily switched. Consequently, only the conducting high-side switch is disconnected (opened or interrupted). This is the left high-side switch HSL with a current flow from the left upper side to the right lower side (see FIG. 6, load current 27). This is the right high-side switch HSR with a current floe from the right upper side to the left lower side (not shown in FIG. 6). The low-side switch LSR or LSL of this side of the bridge does not have to be connected, but it can be connected. The other side of the bridge is and remains applied to ground so that the low-side switch LSL or LSR remains connected. As a result, only the side of the bridge tips independently to ground the bootstrap capacitor Cb of which is to be charged. Thus the output voltage Uout of the H-bridge circuit 25 amounts to 0 V. Consequently, the current flows in free-wheeling mode 28 only through the two lower low-side switches LSL, LSR. The current flowing through the igniter inductivity Lz and thus via the branch of the H-bridge circuit 25 is decelerated only by the lamp current. In this type of circuit, the current I (Lz) would approximate zero passage (0 amp) relatively slowly according to an E-function without, however, crossing the current's passage through zero. In comparison with the first embodiment shown in FIGS. 3 to 5, this embodiment allows for considerably more time for recharging the bootstrap capacitor Cb until the lamp current is so small that the electric arc in the gas-discharge lamp 11 would be extinguished. The second embodiment provides for the possibility of controlling the high-side switch HSL or HSR individually, which is not provided with several H-bridge drivers 22 or bootstrap circuits currently available on the market.

Figure 7B:
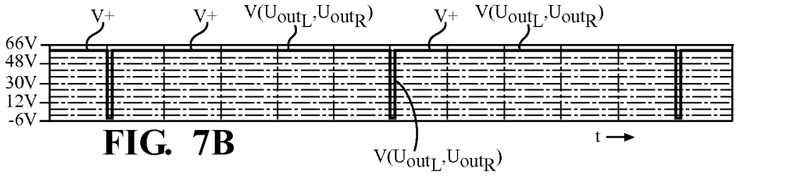
Figure 7C:
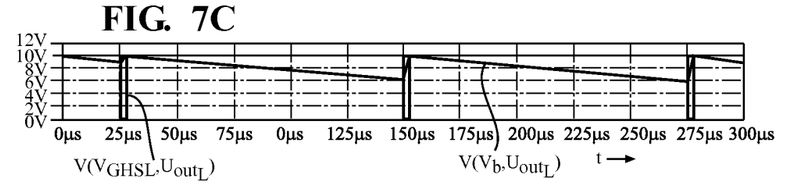
Figure 8A:
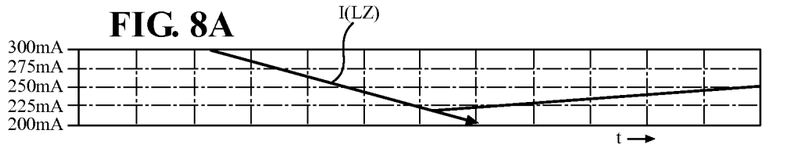
FIG. 8 shows the signal paths shown in FIG. 7 in a time domain between 0 and 6 μs.
Figure 8B:
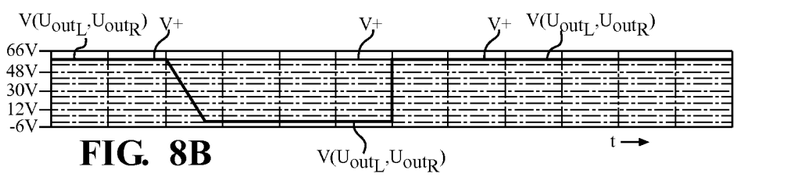
Figure 8C:
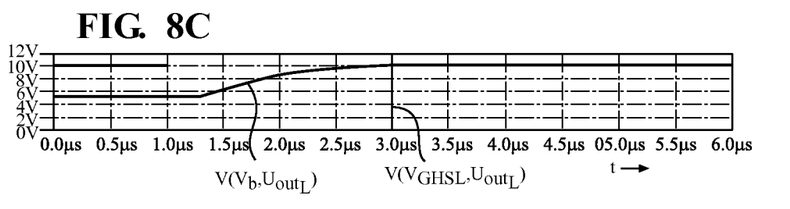

The signal paths shown in FIGS. 7 and 8 were charted for the same magnitudes as those shown in FIGS. 4 and 5 for the first embodiment. It is clearly shown that in the second embodiment the recharging process is also active between 1 µs and 3 µs (i.e., altogether lasting 2 µs). However, the lamp current I (Lz) drops significantly slower (see FIG. 5a) than in the first embodiment (see FIG. 5a), because at the end of the shutdown the lamp current I (Lz) has dropped merely to a little less than 225 mA. FIG. 8b shows that at the start of the shutdown the left side of the H-bridge circuit 25 tips independently to ground. Toward the end of the recharging process, the output Uout of the H-bridge circuit 25 is applied to ground. Connecting and disconnecting the recharging process and the process of charging the bootstrap capacitor Cb according to FIGS. 7c and 8c basically corresponds to connecting and disconnecting the recharging process and the process of charging the capacitor Cb according to the first embodiment (see FIGS. 4c and 5c).

For gas-discharge lamps 1 the period of the recharging process is in a range of a few microseconds, while the direct current phases between the recharging processes are in the range of milliseconds. This means that that the repetition rate of the recharging pulses can be at the same frequency than the actual "alternating current" operation (i.e., in the approximate range of 400 Hz). The temporary drop of current I (Lz) during the recharging pulses (see FIGS. 4a and 7a) in the light emitted by the light module is not visible to the human eye. Although, according to the invention, short-term repeated recharging processes take place during the "direct current" operation, it can be the that in the invention the gas-discharge lamp 11 is operated with "direct current" operation and not with "alternating current" operation. It is crucial that in the invention no commutation (change of direction) of the current takes place with "direct current" operation as is the case with "alternating current" operation.

The short recharging times in the range of a few microseconds mean that the microcontroller controlling the recharging process must be able to emit very short control impulses in the microsecond range.

In the first embodiment of the invention, a 25-watt gas-discharge lamp could be dimmed in "direct current" operation up to below 15 watts. The second embodiment or the quick drivers 22 provided for the embodiment and the separate possibility of controlling individual semiconductor switches could be integrated in a newly developed H-bridge component. Then the power of a 25-watt lamp could be controlled up to below 10 watts.

The invention can be used with all gas-discharge lamps in which "direct current" operation is provided for reducing power. This is especially the case with a 25-watt gas-discharge lamp of the type D5 that is currently in the process of development. The 25-watt gas-discharge lamp with integrated ignition unit and integrated control unit currently has the designation ""D5S"". Furthermore, the invention makes it possible with any gas-discharge lamps to extend the first two required longer direct current phases that are required after igniting the electric arc for heating the electrodes, or to perform the direct current phases with very small bootstrap capacitors Cb (i.e., to decrease their structural shape or capacity). However, it is also possible with the invention to operate with direct current other inductive loads (for example, electric motors or electromagnets that are controlled by switching and for which bootstrap H-bridge circuits should be used).

It should be appreciated that the invention has been described above in an illustrative manner. It should be so appreciated also that the terminology that has been used above is intended to be in the nature of words of description rather than of limitation. It should be so appreciated also that many modifications and variations of the invention are possible in light of the above teachings. It should be so appreciated also that, within the scope of the appended claims, the invention may be practiced other than as specifically described above.

What is claimed is:

1. A method for operating a light source of a motor-vehicle headlamp using direct current, wherein the light source was originally provided to be operated with alternating current, includes an inductive load, is arranged between branches of an electric H-bridge circuit with two high-side and two low-side closed semiconductor switches, and is applied with the alternating current in alternating current operation via the H-bridge circuit and each of the high-side switches arranged on top is controlled via a bootstrap circuit with a respective bootstrap capacitor, the method comprising steps of:
   in direct current operation, periodically and temporarily disconnecting at least one of the switches for a recharging process;
   reconnecting the at least one of the switches at an end of the recharging process; and
   concluding the recharging process before current flowing via a branch of the H-bridge circuit reaches a value of about zero amps.

2. The method according to claim 1, wherein the recharging process lasts fewer than about five microseconds.

3. The method according to claim 1, wherein a distance between two successive ones of the recharging process is such that, prior to a subsequent one of the recharging process, a load of the bootstrap capacitor is still sufficiently great to safely control at least one of the high-side switches.

4. The method according to claim 3, wherein the distance is in the millisecond range.

5. The method according to claim 1, wherein, in the direct current operation for the recharging process, one of the high-side switches and one of the low-side switches is periodically and temporarily disconnected.

6. The method according to claim 1, wherein, in the direct current operation for the recharging process, one of the high-side switches is periodically and temporarily disconnected.

7. An electric circuit for operating a light source of a motor-vehicle headlamp, wherein the light source was originally provided to be operated with alternating current using direct current and includes a conductive load, the electric circuit comprising:
   an electric H-bridge circuit with two high-side and two low-side closed semiconductor switches for supplying the light source with the alternating current in alternating current operation, the light source being arranged between branches of the H-bridge circuit;
   bootstrap circuits each of which is provided with a bootstrap capacitor and for controlling one of the high-side switches; and
   a recharger for occasionally recharging the bootstrap capacitor by temporarily disconnecting and reconnecting at least one of the switches in direct current operation, a period of the recharging being predetermined such that the recharging is concluded before current flowing via one of the branches of the H-bridge circuit reaches a value of about zero amps.

8. The electric circuit according to claim 7, wherein the period of the recharging is fewer than about five microseconds.

9. The electric circuit according to claim 7, wherein a distance between two successive ones of the recharging is such that a load of the bootstrap capacitor is still sufficiently great to safely control at least one of the high-side switches.

10. The electric circuit according to claim 9, wherein the distance is in the millisecond range.

11. The electric circuit according to claim 7, wherein, in the direct current operation, one of the high-side switches and one of the low-side switches is periodically and temporarily switched.

12. The electric circuit according to claim 7, wherein, in the direct current operation for the recharging process, one of the high-side switches is periodically and temporarily switched.

13. A light module of a motor-vehicle headlamp, the light module comprising:
   a light source with inductive load; and
   a circuit for operating the light source and including:
      an electric H-bridge circuit with two high-side and two low-side closed semiconductor switches for supplying the light source with the alternating current in alternating current operation, the light source being arranged between branches of the H-bridge circuit;
      bootstrap circuits each of which is provided with a bootstrap capacitor and for controlling one of the high-side switches; and
      a recharger for occasionally recharging the bootstrap capacitor by temporarily disconnecting and reconnecting at least one of the switches in direct current operation, a period of the recharging being predetermined such that the recharging is concluded before current flowing via one of the branches of the H-bridge circuit reaches a value of about zero amps.

14. The light module according to claim 13, wherein the circuit is part of a control unit of the light source.

15. The light module according to claim 13, wherein the light source is a gas-discharge lamp.

16. A motor-vehicle headlamp comprising:
   a housing having a light-emitting aperture that is closed with a transparent cover plate; and
   at least one light module arranged in the housing and including a light source with inductive load and a circuit for operating the light source, wherein the circuit has:
      an electric H-bridge circuit with two high-side and two low-side closed semiconductor switches for supplying the light source with the alternating current in alternating current operation, the light source being arranged between branches of the H-bridge circuit;
      bootstrap circuits each of which is provided with a bootstrap capacitor and for controlling one of the high-side switches; and
      a recharger for occasionally recharging the bootstrap capacitor by temporarily disconnecting and reconnecting at least one of the switches in direct current operation, a period of the recharging being predetermined such that the recharging is concluded before current flowing via one of the branches of the H-bridge circuit reaches a value of about zero amps.

* * * * *